United States Patent [19]
Ohmi et al.

[11] Patent Number: 5,366,261
[45] Date of Patent: Nov. 22, 1994

[54] PIPE JOINT WITH A GASKET RETAINER

[75] Inventors: Tadahiro Ohmi, Miyagi; Tsutomu Shinohara, Osaka; Michio Yamaji, Osaka; Nobukazu Ikeda, Osaka; Kenji Yamamoto, Osaka, all of Japan

[73] Assignee: Fujikin Incorporated, Osaka, Japan

[21] Appl. No.: 49,366

[22] Filed: Apr. 21, 1993

[30] Foreign Application Priority Data

Apr. 27, 1992 [JP] Japan .................. 4-108080

[51] Int. Cl.⁵ .................. F16L 23/032; F16L 19/03
[52] U.S. Cl. .................. 285/328; 285/379;
285/354; 285/917; 285/281; 277/236
[58] Field of Search .................. 285/328, 379, 917, 910,
285/353, 354, 281; 277/236, 9.5

[56] References Cited

U.S. PATENT DOCUMENTS

| 2,050,137 | 8/1936 | Walsh | 285/917 |
|---|---|---|---|
| 2,528,665 | 11/1950 | Peterson et al. | 285/917 |
| 2,926,937 | 3/1960 | Parsons | 285/917 |
| 4,854,597 | 8/1989 | Leigh . | |
| 5,040,714 | 8/1991 | McManigal | 285/917 |
| 5,088,773 | 2/1992 | Gralenski | 285/328 |
| 5,135,269 | 8/1992 | Babuder | 285/328 |
| 5,145,219 | 9/1992 | Babuder | 285/379 |
| 5,163,721 | 11/1992 | Babuder | 285/379 |
| 5,196,814 | 3/1993 | Felker et al. | 295/917 |
| 5,251,941 | 10/1993 | McGarvey | 285/328 |

FOREIGN PATENT DOCUMENTS

| 378493 | 7/1990 | European Pat. Off. | 285/328 |
|---|---|---|---|
| WO89/03495 | 4/1993 | France . | |
| 1228871 | 11/1966 | Germany . | |
| 3330443A1 | 2/1984 | Germany . | |
| 2038972 | 7/1980 | United Kingdom | 285/328 |
| 836443 | 4/1979 | U.S.S.R. . | |

*Primary Examiner*—Eric K. Nicholson
*Attorney, Agent, or Firm*—Armstrong, Westerman, Hattori, McLeland & Naughton

[57] ABSTRACT

A pipe joint comprises a pair of tubular joint members having a gasket holding annular projection on each of butting faces thereof, an annular gasket interposed between the butting end faces of the joint members, and a nut for connecting the joint members together. When the nut is tightened up, an indentation is formed in a surface of the gasket pressed by each of the gasket holding projections, and the gasket is pressed also by a portion of the end face of each joint member having no annular projection.

4 Claims, 3 Drawing Sheets

PIPE JOINT WITH A GASKET RETAINER

BACKGROUND OF THE INVENTION

The present invention relates to pipe joints.

Pipe joints are already known which comprise a pair of tubular joint members having a gasket holding annular projection on each of butting end faces thereof, an annular gasket interposed between the butting end faces of the joint members, and threaded means for connecting the joint members together.

The conventional pipe joint is so adapted that when the threaded means is tightened up, the two joint members are drawn toward each other, pressing the annular projections against the respective opposite surfaces of the gasket to provide a fluidtight joint. At this time, the annular projections only are strongly pressed against the gasket with the resulting likelihood of the gasket bending or twisting. This leads to the problem of decreasing the pressure of the annular projections on the gasket to entail a reduced sealing effect.

SUMMARY OF THE INVENTION

The main object of the present invention is to provide a pipe joint of the type described wherein when the threaded means is tightened up, the gasket is prevented from bending and twisting and held between the entire opposed end faces of the two joint members and which is thus given an outstanding sealing property.

The present invention provides a pipe joint of the type described wherein when the threaded means is tightened up, an indentation is formed in a surface of the gasket pressed by each of the gasket holding annular projections, and the gasket is pressed also by a portion of the end face of each of the joint members having no annular projection. This prevents the gasket from being bent and twisted by being strongly pressed only by the annular projections, further permitting the entire opposed end faces of the two joint members to hold the gasket therebetween, whereby an excellent sealing effect is achieved.

According to an aspect of the invention, the gasket comprises an inner annular portion, an outer annular portion having opposite surfaces projecting outward axially thereof beyond opposite surfaces of the inner annular portion, and a tapered portion between the outer annular portion and the inner annular portion, the gasket holding annular projections being adapted to bear on the respective opposite surfaces of the inner annular portion and the tapered portion. The gasket is then strongly pressed on both the inner annular portion and the tapered portion by the gasket holding annular projections. This produces a more excellent sealing effect.

According to another aspect of the invention, the two joint members are each formed along the outer periphery of the butting end face thereof with an over-tightening preventing annular projection projecting beyond the gasket holding annular projection for pressing a retainer on each surface thereof. This assures that the threaded means will be tightened up properly without overtightening, further preventing the gasket holding annular projection of the joint member from damage before assembling.

DESCRIPTION OF THE PREFERRED EMBODIMENTS

Figure 1:
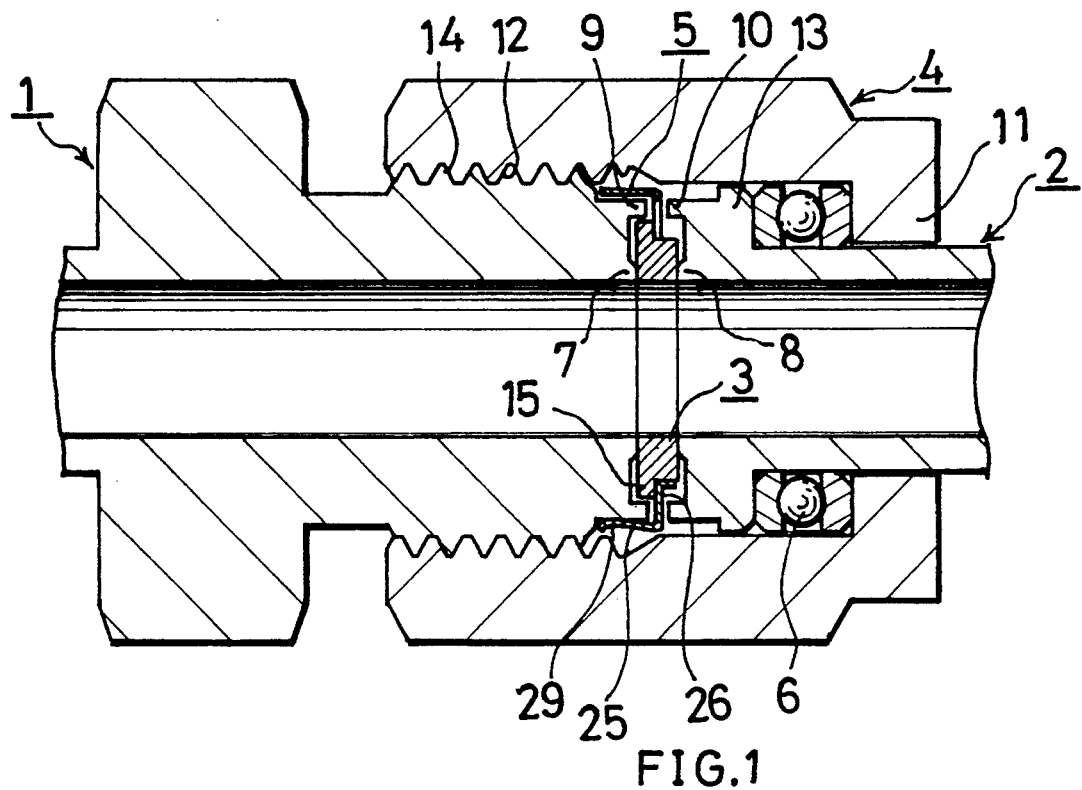
FIG. 1 is a view in longitudinal section showing a first embodiment of pipe joint of the invention.
Figure 2:
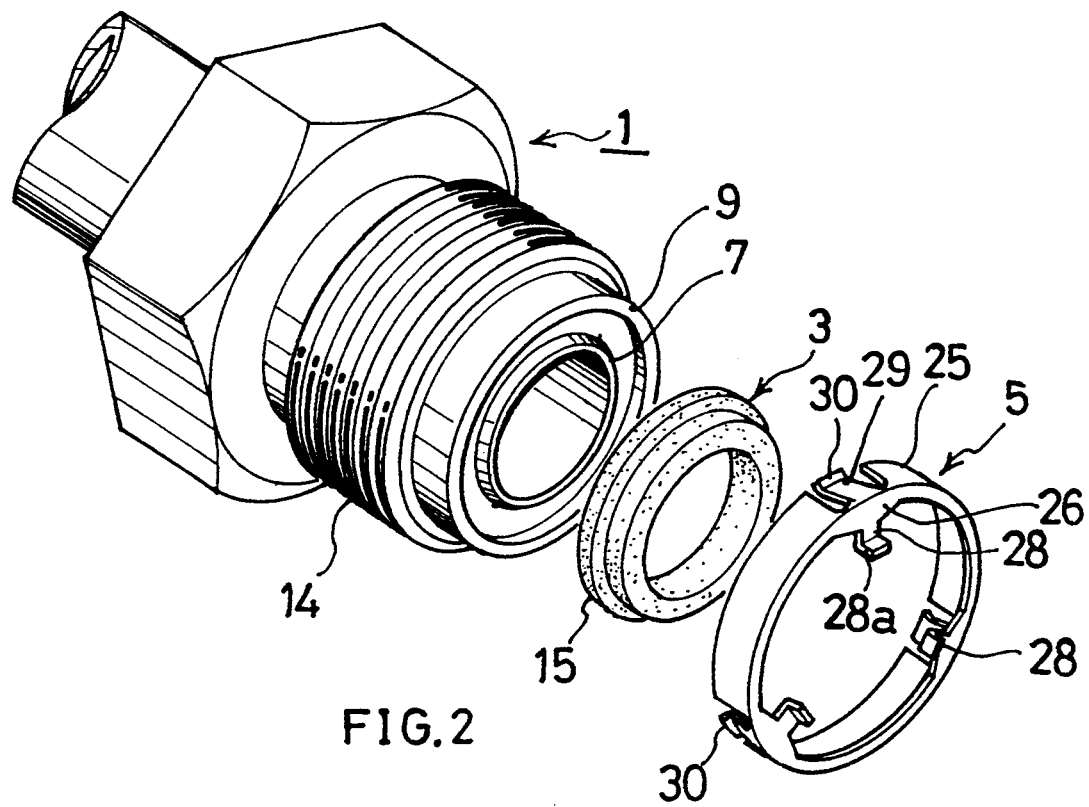
FIG. 2 is an exploded fragmentary perspective view of FIG. 1.

Several embodiments of the present invention will be described below with reference to the accompanying drawings. In the following description, the terms "right" and "left" refer to the right-hand side and left-hand side of the drawings, respectively.

FIGS. 1 to 4 show a pipe joint which comprises a first tubular joint member 1, a second tubular joint member 2, an annular gasket 3 interposed between the right end face of the first joint member 1 and the left end face of the second joint member 2, and a retainer 5 holding the gasket 3 thereon and held to the first joint member 1. The second joint member 2 is fastened to the first joint member 1 by a nut 4 provided on the second joint member 2 and screwed on the first joint member 1.

The retainer 5, which is in the form of an integral plate of stainless steel, comprises an annular portion 25, a gasket holding portion 26 including three claws 28 inwardly projecting from the right end of the annular portion 25 for holding the outer periphery of the gasket 3, and a joint member holding portion 29 engageable with the right end of the first joint member 1.

The three claws 28 are slightly elastic. The outer end of each claw 28 provides a lug 28a bent rightward and having slight elasticity. Before the gasket 3 is fitted into the retainer 5, the lug 28a is bent at an angle larger than a right angle as indicated in a broken line in FIG. 3. When the gasket 3 is fitted to the inside of the claws 28 with the bent lugs 28a in intimate contact with the gasket 3, the gasket 3 is held in the retainer 5 and prevented from moving radially and axially thereof.

A pair of axial cutouts is formed in the annular portion 25 at the position of each of the three claws 28 to provide a holding claw 30. The joint member holding portion 29 comprises these three claws 30. The three holding claws 30 grip the right end of the first joint member 1 elastically, whereby the retainer 5 is held to the first joint member 1.

The nut 4 is formed at its right end with an inner flange 11, which is fitted around the second joint member 2. The nut 4 has an internally threaded left end portion 12, which is screwed on an externally threaded portion 14 at the right end of the first joint member 1. An outer flange 13 is formed around the left end of the second joint member 2. A thrust ball bearing 6 for preventing conjoint rotation is interposed between the flange 13 and the inner flange 11 of the nut 4.

The gasket 3, which is made of nickel alloy, is plated with silver when so required. Austenitic stainless steel, copper, aluminum alloy or like suitable material is usable for making the gasket 3. The gasket 3 has on the outer periphery of its left end a slipping-off preventing portion 15 in the form of an outer flange and engageable with the gasket holding portion 26 of the retainer 5. Accordingly, the gasket 3, even if forced against the retainer 5, will not slip off the retainer 5 from the right side thereof. This makes it easy to cause the retainer 5 to hold the gasket 3 thereon and to cause the joint members 1, 2 to hold the retainer 5 therebetween.

The joint members 1, 2 are formed on their butting end faces with gasket holding annular projections 7, 8, respectively, along the inner peripheries thereof and with overtightening preventing annular projections 9, 10, respectively, along the outer peripheries thereof. The height of the gasket holding annular projections 7, 8 is slightly smaller than the amount by which each of the joint members 1, 2 is moved axially thereof (in the right-left direction) relative to the gasket 3 when the joint is properly tightened up. Each of the gasket holding annular projections 7, 8 has a sectorial cross section corresponding to approximately a quarter of a circle. The inner peripheral surface of each joint member 1 (2) including the inner peripheral surface 7a (8a) of the projection 7 (8) is in the form of a tapered surface slightly flaring toward the projection outer end, for example, at an angle of about 5 degrees. The inside diameter of the outer end of the projection 7 (8) is equal to the inside diameter of the gasket 3 so that the projection 7 (8) comes into contact with the inner edge portion of the gasket 3 over the entire circumference thereof.

The overtightening preventing annular projections 9, 10 project out beyond the respective projections 7, 8 and are adapted to press the retainer 5 on its respective surfaces when the nut 4 is tightened up properly. These projections 9, 10 protect the gasket holding annular projections 7, 8 of the joint members 1, 2 before assembling, whereby the projections 7, 8 are prevented from damage that would seriously affect the sealing effect.

Figure 3:
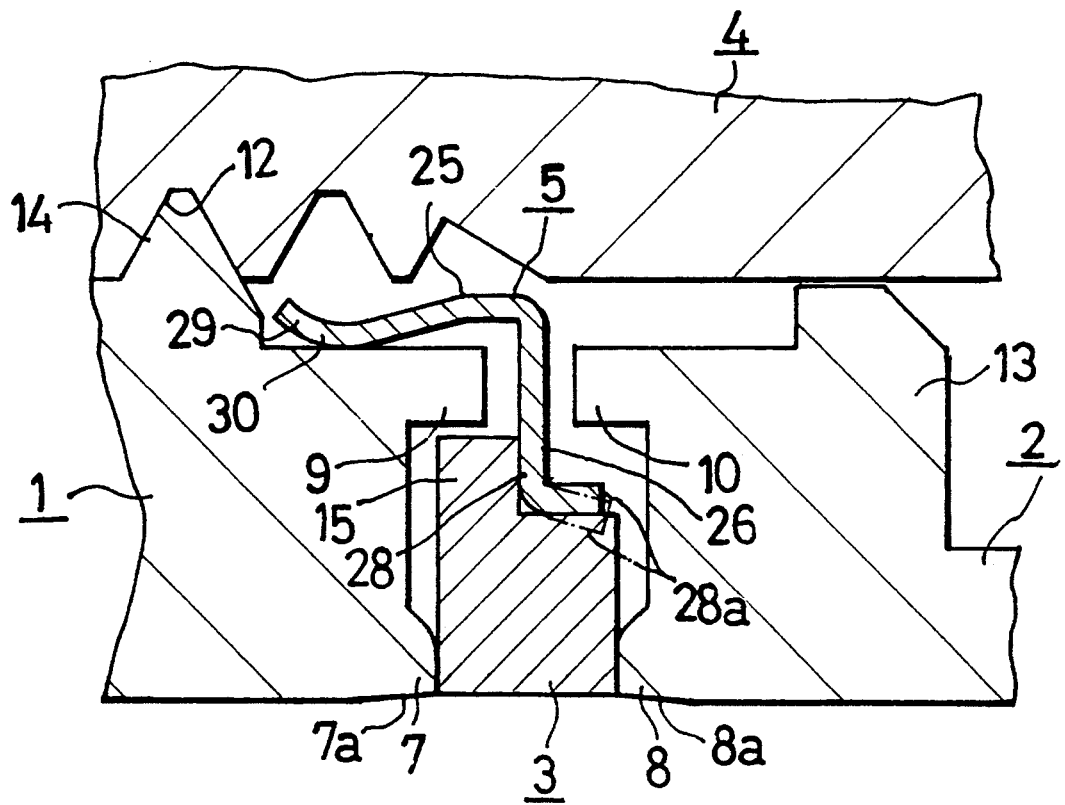
FIG. 3 is an enlarged fragmentary view in section showing the pipe joint of the first embodiment as manually tightened up.

When the nut 4 on the second joint member 2 is screwed on the first joint member 1 and manually tightened up, the gasket 3 is pressed on its opposite surfaces only by the outer ends of the gasket holding projections 7, 8 as shown in FIG. 3.

Figure 4:
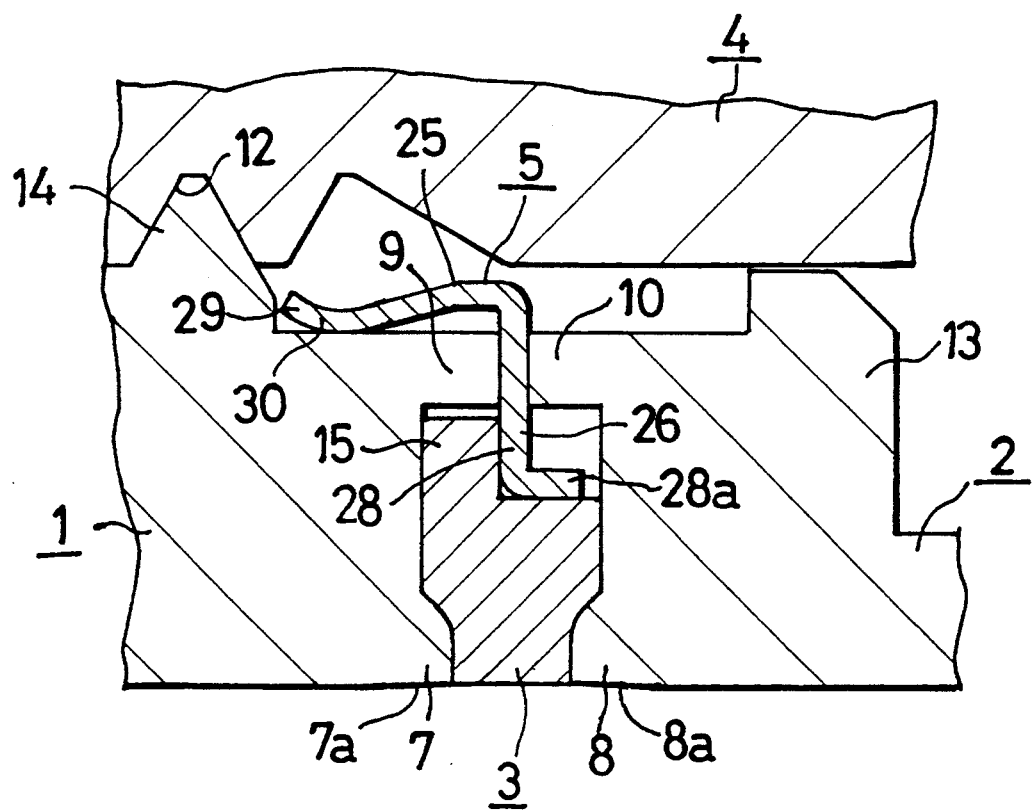
FIG. 4 is an enlarged fragmentary view in section showing the first embodiment as tightened up properly.

When the nut 4 is rotated, for example, by 1/6 of a turn in this state for proper tightening, the holding projection 7 of the first joint member and the holding projection 8 of the second joint member 2 strongly presses the gasket 3 on its opposite surfaces to produce an indentation on each surface of the gasket 3 as shown in FIG. 4 to provide a fluidtight joint. At the same time, the portions of the end faces of the joint members 1, 2 where the projections 7, 8 are not formed also press the gasket 3 on its opposite surfaces, with the result that the gasket 3 is held between the entire end faces of the two joint members 1, 2. This obviates the likelihood that the gasket 3 will be bent and twisted by being strongly pressed on only by the gasket holding projections 7, 8. When the nut 4 is tightened up, the gasket 3 and the gasket holding annular projections 7, 8 are so deformed as to decrease in inside diameter. At this time, the inner peripheral surfaces 7a, 8a of the projections 7, 8 are so deformed as to decrease in taper angle, with the result that the inner peripheral surfaces of the joint members 1, 2 become approximately flush with the inner periphery of the gasket 3.

During tightening, the overtightening preventing annular projections 9, 10 press the retainer 5 from opposite sides. This makes it difficult to further tighten up the nut 4 to prevent overtightening. Because the gasket holding projections 7, 8 are adapted to contact the inner edge portion of the gasket 3 over the entire circumference thereof, the pipe joint has no recess in which a fluid will be trapped.

Figure 5:
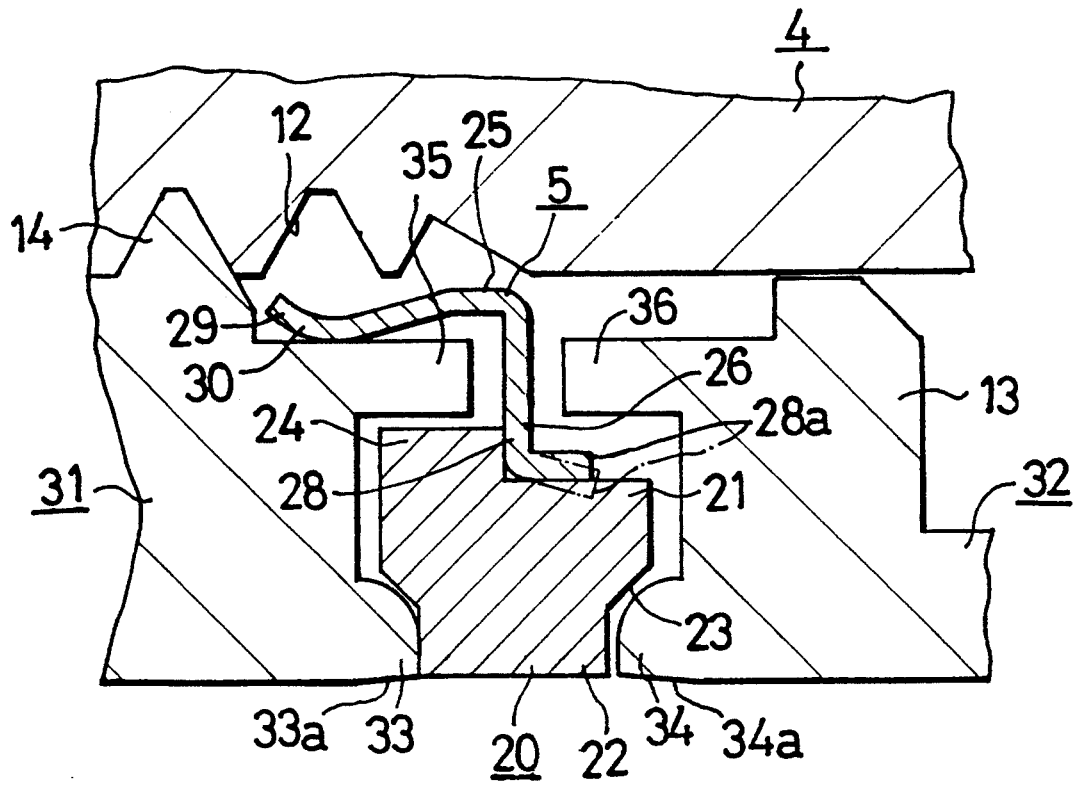
FIG. 5 is an enlarged fragmentary view in section showing another pipe joint, i.e., a second embodiment, as manually tightened up.
Figure 6:
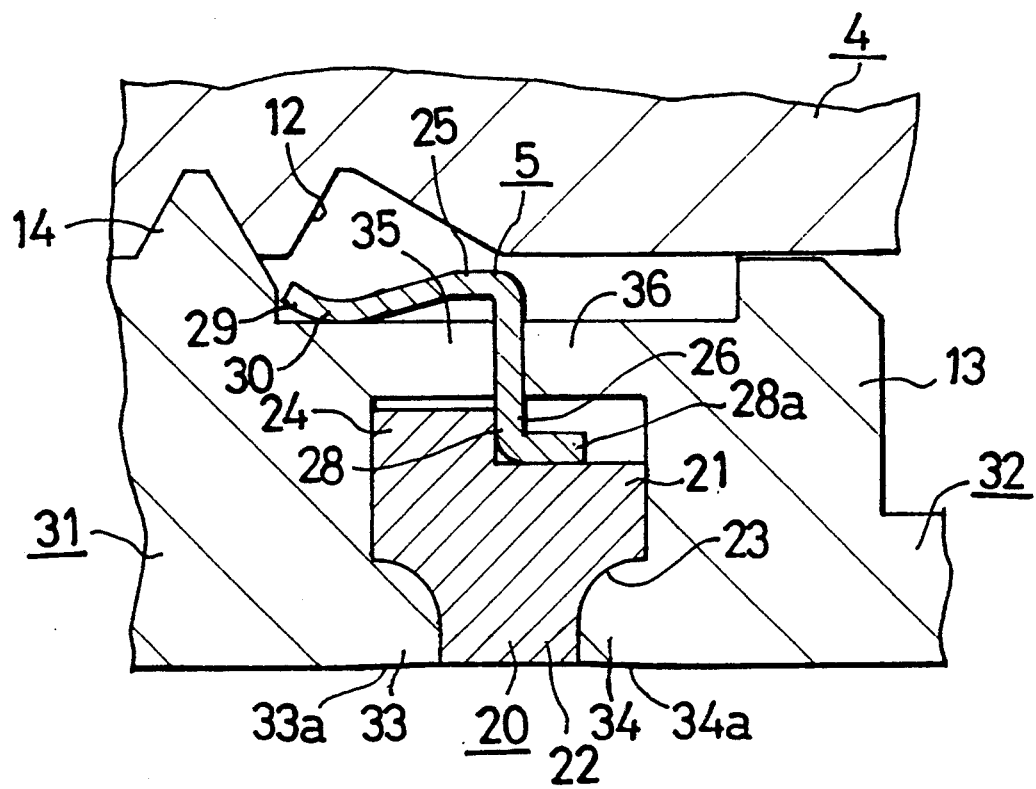
FIG. 6 is an enlarged fragmentary view in section showing the second embodiment as tightened up properly.

FIGS. 5 and 6 show a second embodiment. Throughout the drawings, like parts are designated by like reference numerals.

FIG. 5 shows the embodiment before tightening. The butting end faces of joint members 31, 32 are formed with gasket holding annular projections 33, 34, respectively, along their inner peripheries and with over-tightening preventing annular projections 35, 36 along their outer peripheries.

The gasket 20 comprises an inner annular portion 22, an outer annular portion 21 having opposite surfaces projecting outward axially thereof beyond opposite surfaces of the inner annular portion 22, and a tapered portion between the outer annular portion 21 and the inner annular portion 22. The gasket holding annular portions 33, 34 are adapted to bear on the respective opposite side surfaces of the inner annular portion 22 and the tapered portion 23.

The mount of projection of each of opposite surfaces of the outer annular portion 21 beyond each of opposite surfaces of the inner annular portion 22 is slightly larger than the height of the gasket holding projections 33, 34 minus the amount by which each of the joint members 31, 32 is axially moved relative to the gasket 20 when the nut 4 is tightened up properly. Each of the gasket holding projections 33, 34 has a sectorial cross section corresponding to approximately a quarter of a circle. The inner peripheral surface of each joint member 31 (32) including the inner peripheral surface 33a (34a) of the projection 33 (34) is in the form of a tapered surface slightly flaring toward the projection outer end, for example, at an angle of about 5 degrees. The inside diameter of the outer end of the projection 33 (34) is equal to the inside diameter of the gasket 20.

Before the nut 4 is tightened up, the outer end of each projection 33 (34) is in contact with the innner edge portion of the gasket 20 over the entire circumference thereof, with a clearance formed between the outer peripheral surface thereof and the gasket 20.

The outer annular portion 21 has on its outer periphery a slipping-off preventing portion 24 in the form of an outer flange. Accordingly, the gasket 20, even if forced against the retainer 5, will not slip off the retainer 5 from the right side thereof. This makes it easy to cause the retainer 5 to hold the gasket 20 thereon and to cause the joint member 31, 32 to hold the retainer therebetween.

The overtightening preventing annular projections 35, 36 project out beyond the respective gasket holding annular projections 33, 34 and are adapted to press the retainer 5 on its respective surfaces when the nut 4 is tightened up properly. These projections 35, 36 protect the gasket holding projections 33, 34 of the joint members 31, 32 before assembling, whereby the projections 33, 34 are prevented from damage that would seriously affect the sealing effect.

When the pipe joint of the second embodiment is manually tightened, followed by rotation of the nut 4, for example, by 1/6 of a turn for proper tightening, the outer ends of the gasket holding projections 33, 34 of the two joint members 31, 32 are first strongly pressed against the respective opposite surfaces of the inner annular portion 22 of the gasket 20. Subsequently, the outer peripheral surfaces of the projections 33, 34 are strongly pressed against the tapered portion 23 of the gasket 20. This causes the opposite surfaces of the gasket 20 to fit to the end faces of the respective projections 33, 34 in conformity with the shape thereof to provide a fluidtight joint as shown in FIG. 6. At the same time, the portions of the end faces of the joint members 31, 32 where the projections 33, 34 are not formed also press the gasket 20 on its opposite surfaces, with the result that the gasket 20 is held between the entire end faces of the two joint members 31, 32. This eliminates the likelihood that the gasket 20 will be bent and twisted by being strongly pressed on only by the gasket holding projections 33, 34. When the nut 4 is tightened up, the gasket 20 and the gasket holding annular projections 33, 34 are so deformed as to decrease in inside diameter. At this time, the inner peripheral surfaces 33a, 34a of the projections 33, 34 are so deformed as to decrease the taper angle, with the result that the inner peripheral surfaces of the joint members 31, 32 become approximately flush with the inner peripheral surface of the gasket 20.

During tightening, the outer ends of the gasket holding projections 33, 34 of the two joint members 31, 32 are strongly pressed against the respective surfaces of the inner annular portion 22 of the gasket 20, and the outer peripheral parts of the projections 33, 34 are thereafter strongly pressed against the tapered portion 23 of the gasket 20, so that the projections 33, 34 in contact with the gasket tapered portion 23 are unlikely to move axially. Consequently, no fine particles will be produced owing to the frictional contact of the projections 33, 34 with the gasket 20. This obviates the problem that fine particles produced during assembling of the pipe joint will contaminate the fluid through the joint.

The overtightening preventing annular projections 35, 36 press the retainer 5 from opposite sides, thereby making it difficult to further tighten up the nut 4 to prevent overtightening. Because each of the projections 33, 34 is adapted to contact the inner edge part of the gasket 20 over the entire circumference thereof, the pipe joint has no recess in which the fluid will be trapped.

Moreover, the gasket holding projections 33, 34 are forcibly pressed against both the inner annular portion 22 and the tapered portion 23 of the gasket 20. This produces a more reliable sealing effect than in the first embodiment.

The gasket holding portion 26 of the retainer comprises three claws 28 according to the foregoing two embodiments, whereas the number of claws is variable suitably. Although the outer end of each claw 28 is bent rightward to provide the lug 28a having slight elasticity, the bent lug 28a need not always be formed. In the absence of the lug 28a, it is desired to give the outer end of the claw 28 a curvature equal to the curvature of the outer periphery of the gasket 3 (20) for the claw 28 to hold the gasket 3 (20) over an increased area. Although the joint member holding portion 29 comprises three holding claws 30, this portion can be modified suitably. The inner peripheral surfaces 7a, 8a, 33a, 34a of the gasket holding projections 7, 8, 33, 34 are each in the form of a tapered surface flaring toward the gasket, whereas each of these peripheral surfaces may be flush with the inner peripheral surface of the gasket 3 (20).

What is claimed is:

1. A pipe joint comprising a pair of tubular joint members, each joint member having a butting face and a gasket holding annular projection on each said butting face extending from an inner surface of each of said tubular joint members, an annular gasket interposed between said butting faces of said joint members, said annular gasket having an inner peripheral annular surface on opposite faces of said gasket for contact, respectively, with said gasket holding annular projection on each said butting face as said butting faces contact said opposite faces of said gasket, a retainer for holding said gasket at a butting face of one of said pair of joint members and threaded means for connecting said joint members together with said retainer and said gasket held thereby therebetween, said pipe joint being characterized in that when said threaded means is tightened, indentations are formed in opposite surfaces of said gasket pressed by said gasket holding annular projections, forming a substantially smooth, recess-free surface between said tubular joint members along the inner surface of said tubular joint members and said retainer is held and said gasket is pressed by said abutting faces of said joint members.

2. A pipe joint comprising a pair of tubular joint members, each joint member having a butting face and a gasket holding annular projection on each said butting face, an annular gasket interposed between said butting faces of said joint members, a retainer for holding said gasket at a butting face of one of said pair of joint members and threaded means for connecting said joint members together with said retainer and said gasket held thereby therebetween, said pipe joint being characterized in that when said threaded means is tightened, an indentation is formed in a surface of said gasket pressed by said gasket holding annular projection, and said retainer is held and said gasket is pressed by said abutting faces of said joint members, said joint members being each formed along the outer periphery of said butting face thereof with an over-tightening preventing annular projection projecting beyond said gasket holding annular projection for pressing said retainer from each side and preventing said joint members from being over-tightened.

3. A pipe joint comprising a pair of tubular joint members, each joint member having a butting face and a gasket holding annular projection on each said butting face, an annular gasket interposed between said butting faces of said joint members, and threaded means for connecting said joint members together, said pipe joint being characterized in that said gasket comprises an inner annular portion, an outer annular portion having opposite surfaces projecting outward axially thereof beyond opposite surfaces of said the inner annular, and a tapered portion between said outer annular portion and said inner annular portion, before said threaded means is tightened up, an outer end of said gasket holding annular projection is in contact with the inner edge portion of said inner annular portion of said gasket over the entire circumference thereof, with a clearance formed between the outer peripheral surface thereof and said tapered portion of said gasket, and when said threaded means is tightened, an indentation is formed in a surface of said gasket pressed by said gasket holding annular projections, and said gasket is pressed also by said butting faces of said joint members.

4. A pipe joint as defined in claim 3 wherein said joint members are each formed along the outer periphery of said butting face thereof with an over-tightening preventing annular projection projecting beyond said gasket holding annular projection.

* * * * *